United States Patent
Nigul (10) Patent No.: US 9,383,993 B2
(45) Date of Patent: *Jul. 5, 2016

(54) ENTERPRISE WIDE SOFTWARE VERSION RECOMMENDATION

(71) Applicant: International Business Machines Corporation, Armonk, NY (US)

(72) Inventor: Leho Nigul, Richmond Hill (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/055,491

(22) Filed: Oct. 16, 2013

(65) Prior Publication Data

US 2014/0143769 A1  May 22, 2014

Related U.S. Application Data

(63) Continuation of application No. 13/683,625, filed on Nov. 21, 2012.

(51) Int. Cl.
 - *G06F 9/44* (2006.01)
 - *G06F 9/445* (2006.01)
 - *G06F 9/45* (2006.01)

(52) U.S. Cl.
 CPC ... *G06F 8/71* (2013.01); *G06F 8/51* (2013.01); *G06F 8/64* (2013.01)

(58) Field of Classification Search
 CPC ............... G06F 8/61; G06F 8/65; G06F 8/67; G06F 8/68; G06F 8/71
 See application file for complete search history.

(56) References Cited

U.S. PATENT DOCUMENTS

| | | | |
|---|---|---|---|
| 6,032,270 A * | 2/2000 | Furukawa et al. | 714/49 |
| 6,477,703 B1 | 11/2002 | Smith et al. | |
| 7,496,897 B1 * | 2/2009 | Dibble et al. | 717/127 |
| 7,496,910 B2 | 2/2009 | Voskuil | |
| 2006/0080656 A1 | 4/2006 | Cain et al. | |
| 2006/0184927 A1 | 8/2006 | Deblaquiere et al. | |
| 2006/0294256 A1 | 12/2006 | Chen | |
| 2007/0169079 A1 * | 7/2007 | Keller et al. | 717/168 |
| 2007/0240151 A1 * | 10/2007 | Marl et al. | 717/174 |

(Continued)

OTHER PUBLICATIONS

United States Patent and Trademark Office, Office Action for U.S. Appl. No. 13/683,625, Apr. 9, 2014, pp. 1-17, Alexandria, VA, USA.
IBM, Using Software Product Profiling to Enhance Software Updates, Disclosure IPCOM000190831D, Dec. 10, 2009, pp. 1-5, IP.com, Published at: http://ip.com/IPCOM/000190831.
United States Patent and Trademark Office, Office Action for U.S. Appl. No. 13/683,625, Oct. 2, 2014, pp. 1-18, Alexandria, VA, USA.
United States Patent and Trademark Office, Office Action for U.S. Appl. No. 13/683,625, Jun. 4, 2015, pp. 1-21, Alexandria, VA, USA.

(Continued)

*Primary Examiner* — Li B Zhen
*Assistant Examiner* — Bradford Wheaton
(74) *Attorney, Agent, or Firm* — Lee Law, PLLC; Christopher B. Lee (57) ABSTRACT

In an illustrative embodiment of a process for software version recommendation, a computer receives information representative of a software instance at a target machine, analyzes the received information using a set of predefined rules and a set of available updates metadata associated with a particular updates agent and target machine to identify information pertinent to a combination of a respective target machine associated with the particular updates agent. The computer, responsive to a determination to send the identified information as a recommendation to the respective target machine, sends the recommendation to the combination of the respective target machine associated with the particular updates agent.

7 Claims, 5 Drawing Sheets

(56) References Cited

U.S. PATENT DOCUMENTS

| | | | |
|---|---|---|---|
| 2008/0127034 A1* | 5/2008 | Pasricha et al. | 717/100 |
| 2011/0029966 A1* | 2/2011 | Moshir et al. | 717/173 |
| 2011/0078675 A1 | 3/2011 | Van Camp et al. | |
| 2011/0307454 A1 | 12/2011 | Ching | |
| 2012/0203970 A1 | 8/2012 | Biran et al. | |
| 2012/0297380 A1* | 11/2012 | Colbert et al. | 718/1 |

OTHER PUBLICATIONS

United States Patent and Trademark Office, Office Action for U.S. Appl. No. 13/683,625, Dec. 3, 2015, pp. 1-22, Alexandria, VA, USA.

United States Patent and Trademark Office, Notice of Allowance for U.S. Appl. No. 13/683,625, Mar. 28, 2016, pp. 1-5, Alexandria, VA, USA.

* cited by examiner

System 400

FIG. 5

ENTERPRISE WIDE SOFTWARE VERSION RECOMMENDATION

RELATED APPLICATIONS

This application is a continuation of, claims priority to, and claims the benefit of U.S. patent application Ser. No. 13/683,625, titled "ENTERPRISE WIDE SOFTWARE VERSION RECOMMENDATION," which was filed in the U.S. Patent and Trademark Office on Nov. 21, 2012, and which is incorporated herein by reference in its entirety.

BACKGROUND

This disclosure relates generally to managing software maintenance in a data processing system and more specifically to defining and enforcing enterprise wide software service recommendations in the data processing system.

Software updates provided by a software vendor typically have different associated priorities in accordance with each respective customer among a set of customers. For example a fix for increasing application server performance by predefined percentage on particular platform might be of no interest for some customers, for example customers not using the particular platform, while being critically important for other customers using the particular platform and waiting for performance improvements.

Currently, each customer typically creates and implements a solution to track software updates deemed to be important and force a specific level of software to be deployed in the respective customer environments. While the described process enables customization, the approach may also create inflated overall cost of ownership for the software due to the added overhead and may also result in customer dissatisfaction. Examples of currently implemented software maintenance management techniques exist.

In one example, a previous management process prescribes a set of process steps that should be considered when patches and software maintenance are installed. However enablement of enforcement for deploying relevant fixes is not present.

In another example, a policy system is described in which an administrator is enabled to filter out computers available on a network when installing a specific software patch. In this system, all updates are centrally driven by the policy system and all computers are online when updates are pushed out in the patch installation process. Using this technique all computers that are online receive the updates at the same time.

In another example, a mechanism for automated software updates rollout for various software components in the networked system is presented. The mechanism simply pushes the updates out in the patch installation process. In another example, a process and mechanism to facilitate distribution of information associated with fix availability from different software vendors to enterprises is presented. In another example, a tool and mechanism to determine whether a certain patch is applicable to a specific computer system is described. In another example, a disclosure advocates only relevant fixes should be installed on specific components but does not provide mechanism for enforcing the relevancy of software maintenances as well as enforcing deployment and installation rules associated with the maintenance.

BRIEF SUMMARY

According to one embodiment, a process for software version recommendation, a computer receives information representative of a software instance at a target machine, analyzes the received information using a set of predefined rules and a set of available updates metadata associated with a particular updates agent and target machine to identify information pertinent to a combination of a respective target machine associated with the particular updates agent. The computer, responsive to a determination to send the identified information as a recommendation to the respective target machine, sends the recommendation to the combination of the respective target machine associated with the particular updates agent.

According to another embodiment, a computer program product for software version recommendation, comprises a non-transitory computer recordable-type media containing computer executable program code stored thereon. The computer executable program code comprises computer executable program code for receiving information representative of a software instance at a target machine; computer executable program code for analyzing the received information using a set of predefined rules and a set of available updates metadata associated with a particular updates agent and target machine; computer executable program code for identifying information pertinent to a combination of a respective target machine associated with the particular updates agent; computer executable program code for determining whether to send the identified information as a recommendation to the respective target machine; and computer executable program code responsive to a determination to send the identified information as a recommendation to the respective target machine, for sending the recommendation to the combination of the respective target machine associated with the particular updates agent.

According to another embodiment, an apparatus for software version recommendation comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to receive information representative of a software instance at a target machine; analyze the received information using a set of predefined rules and a set of available updates metadata associated with a particular updates agent and target machine; identify information pertinent to a combination of a respective target machine associated with the particular updates agent; determine whether to send the identified information as a recommendation to the respective target machine and responsive to a determination to send the identified information as a recommendation to the respective target machine, send the recommendation to the combination of the respective target machine associated with the particular updates agent.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage medium(s) may be utilized. A computer-readable data storage medium may be, for example, but not limited to, an electronic, magnetic, optical, or semiconductor system, apparatus, or device, or any suitable combination of the foregoing. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable data storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
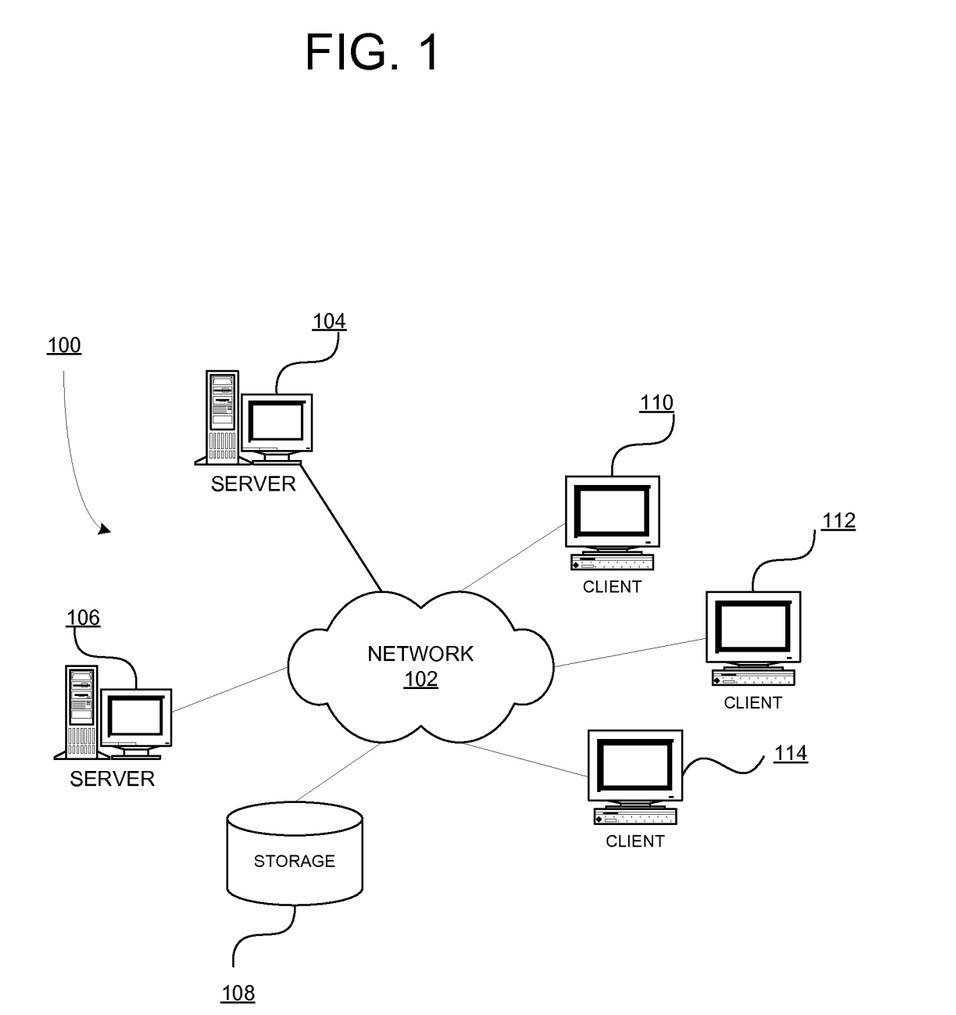
FIG. 1 is a block diagram of an exemplary network data processing system operable for various embodiments of the disclosure.
Figure 2:
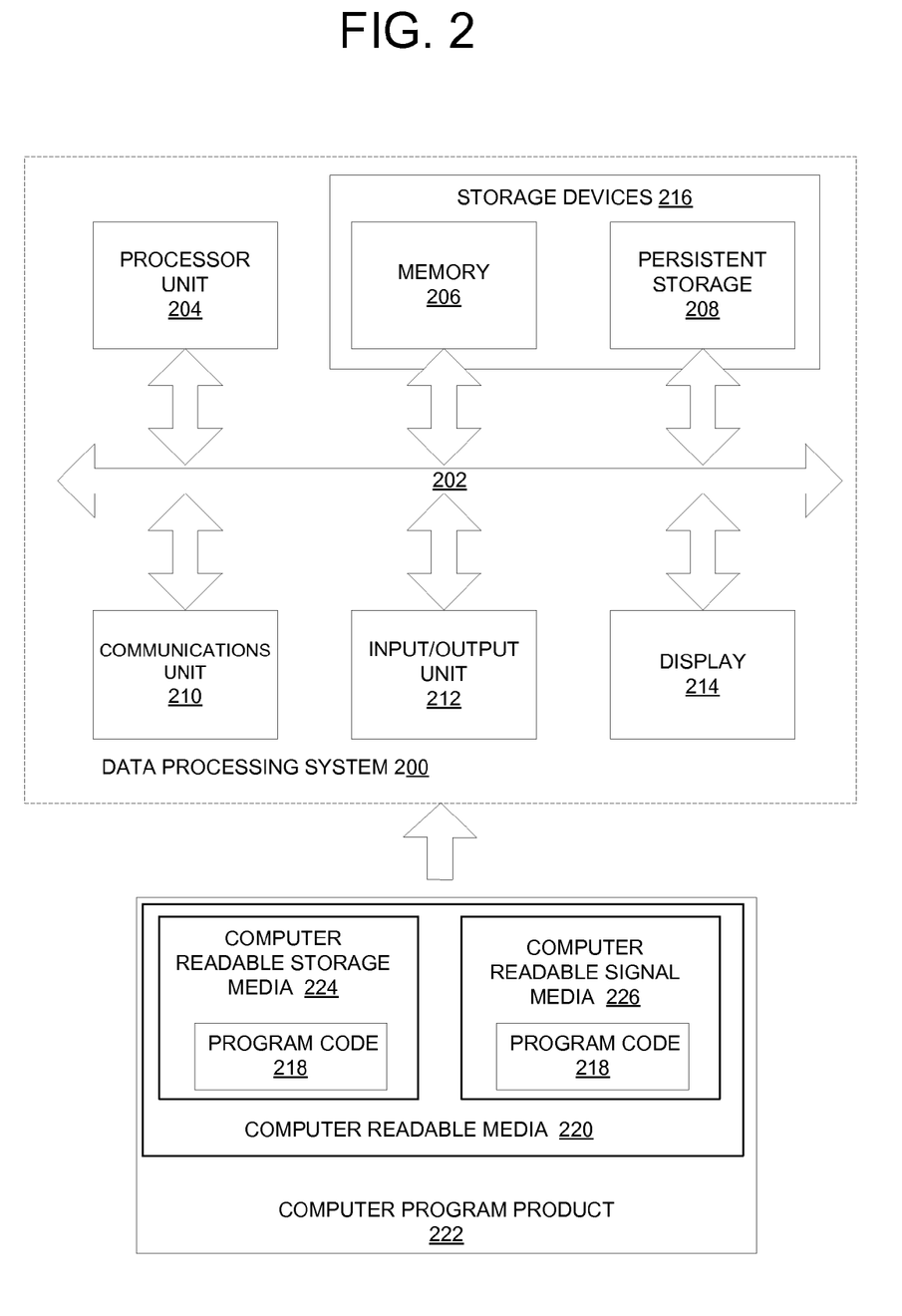
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Embodiments of the disclosure provide a process and a system with a capability of enabling customers to specify a level of importance for a particular software update as well as an ability to manage deployment of the particular software updates.

For example, in one embodiment server 104 and server 106 connect to network 102 along with storage unit 108, wherein server 104 contains a set of software updates and a software maintenance capability. Clients 110, 112, and 114 connect to network 102 and therefore to server 104. In the depicted example, server 104 provides only selected data as needed, such as software updates determined appropriate to clients 110, 112, and 114.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for software version recommendation is presented. Processor unit 204 receives information representative of a software instance at a target machine, and analyzes the received information using a set of predefined rules and a set of available updates metadata associated with a particular updates agent and target machine to identify information pertinent to a combination of a respective target machine associated with the particular updates agent. Processor unit 204, responsive to a determination to send the identified information as a recommendation to the respective target machine, sends the recommendation to the combination of the respective target machine associated with the particular updates agent.

Embodiments of the disclosure provide a capability of prioritized guidance to the user as to the importance of the installation of a software component coupled with the provision of an enforcement capability.

Figure 3:
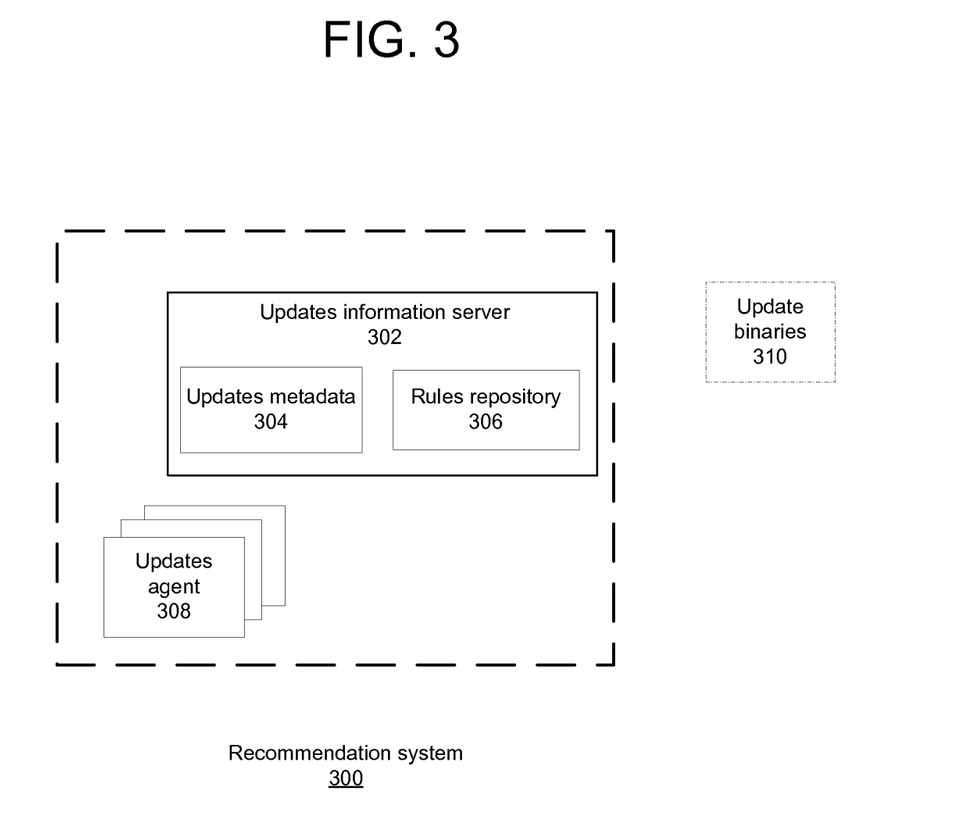
FIG. 3 is a block diagram of a recommendation system operable for various embodiments of the disclosure.

With reference to FIG. 3 a block diagram of a recommendation system operable for various embodiments of the disclosure is presented. Recommendation system 300 is an example of an embodiment of the disclosed defining and enforcing enterprise wide software service recommendation system.

Updates information server 302 provides a capability of an information server to which various computers in the enterprise can connect. In a particular implementation in an enterprise there may be one or more instances of update information servers as needed, for example, when security requires separation between different parts of the corporation a server for each part may be provided. Updates information server 302 further comprises components containing available updates metadata 304 and rules repository 306. Although shown as separate physical elements, the components may be combined within updates information server 302 as logical elements equally well without loss of functional capability.

Available updates metadata 304 describes an inventory of different software updates available to the users within a particular enterprise. Updates available to the users comprise a plurality of elements including operating system service patches, middleware fixes, application versions, and other types of software packages suitable for a particular enterprise. The information of available updates metadata 304 is descriptive for the purpose of analysis and comparison for suitability rather than actual executable or installable program code for execution.

Rules repository 306 contains a set of customized rules defining attributes associated with an element in the plurality of elements representative of different available fixes. For example, an application server fix with an identifier of APAR123 can have assigned a high priority value to an attribute of priority. Rules include information defining a condition, for example, specifying a particular operating system on which updates agent 308 of a particular machine is running, specific levels or a range of acceptable levels of other software available on the system, and different states of system resources, which are acceptable or not acceptable. The definitions of individual rules enable customization according to a particular enterprise installation. A rule definition accordingly specifies conditions, which are to be met to achieve a recommendation.

The rules further define condition processing of attributes of an element, which is inclusive or exclusive, and some combination thereof. For example, a rule may be defined, as product Y fix APAR1234 is only a high priority when there is application Z v7.0.0.5 in combination with database management system version 9 installed on the system S. Rules further define a condition portion in which a custom action to be performed by corresponding updates agent 308 may also be defined. For example a custom action may be defined to override a default action for high priority fixes, thereby further enabling specialization for particular instances.

Specific events are also registered in a rules engine of updates information server 302 providing a capability of specifying which particular events may be used to announce and thereby control conditional processing of rules. For example, on load of a program version information may be obtained and compared to determine whether a proper version of software is executing.

It is important to note that updates information server 302 can be collocated with a centralized (or decentralized) fix binary repository representative of an embodiment of update binaries 310 to provide centralized access to both updates information and binaries. For example, an installation manager repository may be used to enable pushing or pulling of update binaries using one or more of updates agent 308.

Updates agent 308 provides a capability of a lightweight agent/daemon that runs on every machine where managed software is installed. Periodically or per specified event, for example, a start process/launch software command as a specific event registered in a rules engine of updates information server 302, updates agent 308 checks versions of software components either installed, started, or active and reports the findings to updates information server 302. For example, updates agent 308 may intercept a request to start a software instance and determine whether the software instance is a proper configuration and to permit the request to continue or cause the request to pause pending a needed update.

When a software level or predefined set of software levels match existing rules on updates information server 302, updates agent 308 perform one or more specific operations (either default operations or custom operations) depending upon a matching rule. For example using high priority fixes, updates agent 308 might display to a user an alert message and prevent software from starting until the specific software is updated with a corresponding patch.

Using performance considerations, updates agent 308 may cache results of rules processing locally and invalidate the cache per a specific event or on a predetermined scheduled basis. Each of one or more updates agent 308 can register with updates information server 302, enabling updates information server 302 to initiate communication with each of one or more updates agent 308 as needed, for example to flush cache information on command.

In an illustrative embodiment, updates information server 302 can be implemented as a cloud based service, where updates information server 302 is hosted on the cloud, and each tenant (specific client machine) is able to specify custom, tenant specific information (for example each tenant might designate specific custom priority, rules and actions applicable to particular fixes available from one or more of update binaries 310.

Using an embodiment of the disclosed recommendation system 300 provides a capability of typically efficiently managing and accordingly enforcing the priority of software updates, which are of particular importance to a given company or identified portion of the company.

Figure 4:
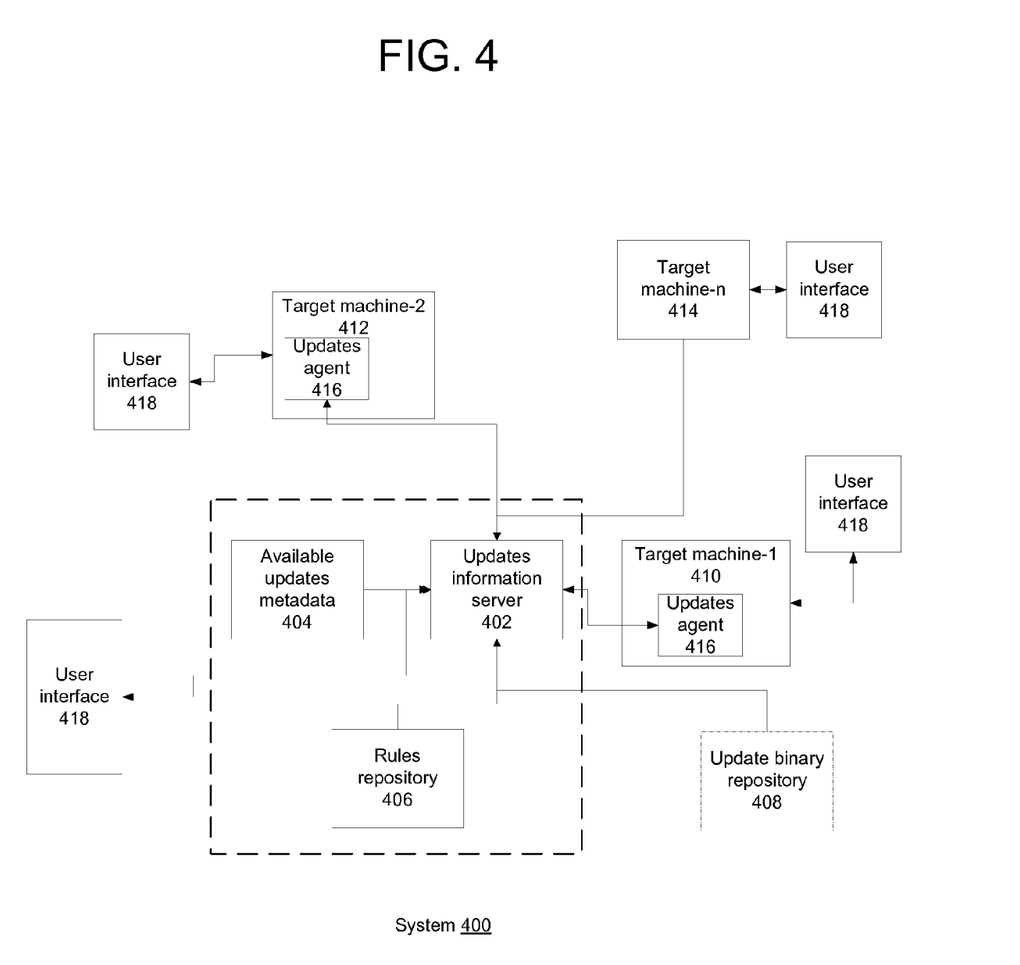
FIG. 4 is a block diagram of relationships within a recommendation system in accordance with one embodiment of the disclosure.

With reference to FIG. 4 a block diagram of relationships within a recommendation system operable for various embodiments of the disclosure is presented. System 400 is an example of an embodiment of the disclosed defining and enforcing enterprise wide software service recommendation system using the example of recommendation system 300 of FIG. 3.

System 400 is represented in three logical portions comprising information server and associated elements, a set of target machines, wherein the set comprises one or more target machines and an optional repository containing binary information representative of software packages including software component updates in the form of fixes which represent product code ranging from a portion of an installed software element or component to a complete replacement of a specific set of software elements or components.

The information server comprises updates information server 402, available updates metadata 404 and rules repository 406. Updates information server 402 processes rules defined within rules repository 406 using information in available updates metadata 404 in combination with information obtained from agents such as update agent 416 operating in each managed software installation of target machine-1 410, target machine-2 412 through target machine-n 414. User interface 418 provides a capability for a user to interact with an instance of updates information server 402 and in a similar manner with a respective target machine.

The information obtained from updates agent 416 includes information representative of versions of software components either installed, started, or active. The information may typically be reported as findings from respective updates agent 416 to updates information server 402. In an alternative manner updates information server 402 may poll updates agent 416 for the desired information.

The processing of the rules in combination with the available updates metadata and information obtained from the one or more updates agent enables updates information server 402 to compute a recommendation, in one aspect of using recommendation system 300 of FIG. 3 for a specific target machine. A recommendation is specific to a target machine because the defined rules and associated information enable a level of granular processing at a specific machine level for the particular software installed at the respective target machine.

In another example, processing of the rules in combination with the available updates metadata and information obtained from the one or more updates agent enables updates information server 402 to enforce a state upon software installed at a target machine, in another aspect of using recommendation system 300 of FIG. 3 for a specific target machine. In this example, an action portion of a rule directs a particular software instance to remain inactive after update agent 416 operating in a managed software installation of a respective target machine captures a startup attempt. The software instance is specified to remain inactive until an update in the form of a fix, update or upgrade is performed on the software instance. Using the described rule processing enables software to be managed and controlled programmatically. To extend the example, a binary update may be obtained from a binary server, for example, update binary repository 408 to install on demand at the respective target machine to resolve the pending startup issue.

Further a target machine need not be active because a recommendation can be posted to await receipt on a respective machine. In this manner, machines may be selectively upgraded according to individual needs of the specific target machine in accordance with a predetermined schedule. Update information received at a respective target machine can be used to trigger installation of an associated package of software at specific target machine. User interface 418 at a target machine can be used to inform a specific user of impending software updates, a history of applied software updates and a current status of active software updates for a respective target machine.

Optionally update binary repository 408 is used to provide the software binaries as indicated in a particular recommendation. Processing of the defined rules ensures conformance to a defined management policy to ensure timely updates are performed when and where needed.

Although shown in the current example as a singular entity of an information server comprising updates information server 402, available updates metadata 404 and rules repository 406, an alternative embodiment employs multiples of updates information server 402, available updates metadata 404 and rules repository 406 without loss of function. For example, an embodiment of updates information server 402, available updates metadata 404 and rules repository 406 may be combined for a specific grouping by machines, geography or particular software sets. In another example, one or more updates information server 402 may be used in combination with a single instance of available updates metadata 404 and rules repository 406.

In another example, updates information server 402, available updates metadata 404 and rules repository 406 may be provided as a distributed service remotely connected via a network to a plurality of target machines. In an alternative example, one or more updates information server 402 may be used in some combination with instances of available updates metadata 404 and rules repository 406 further in combination with update binary repository 408. In another example, a single updates information server 402, may be in communication with one or more available updates metadata 404 and one or more rules repository 406 locally or remotely connected via a network to a plurality of target machines in which the one or more available updates metadata 404 and one or more rules repository 406 can be shared or separately assigned to a predetermined group of target machines according to predetermined criteria.

Figure 5:
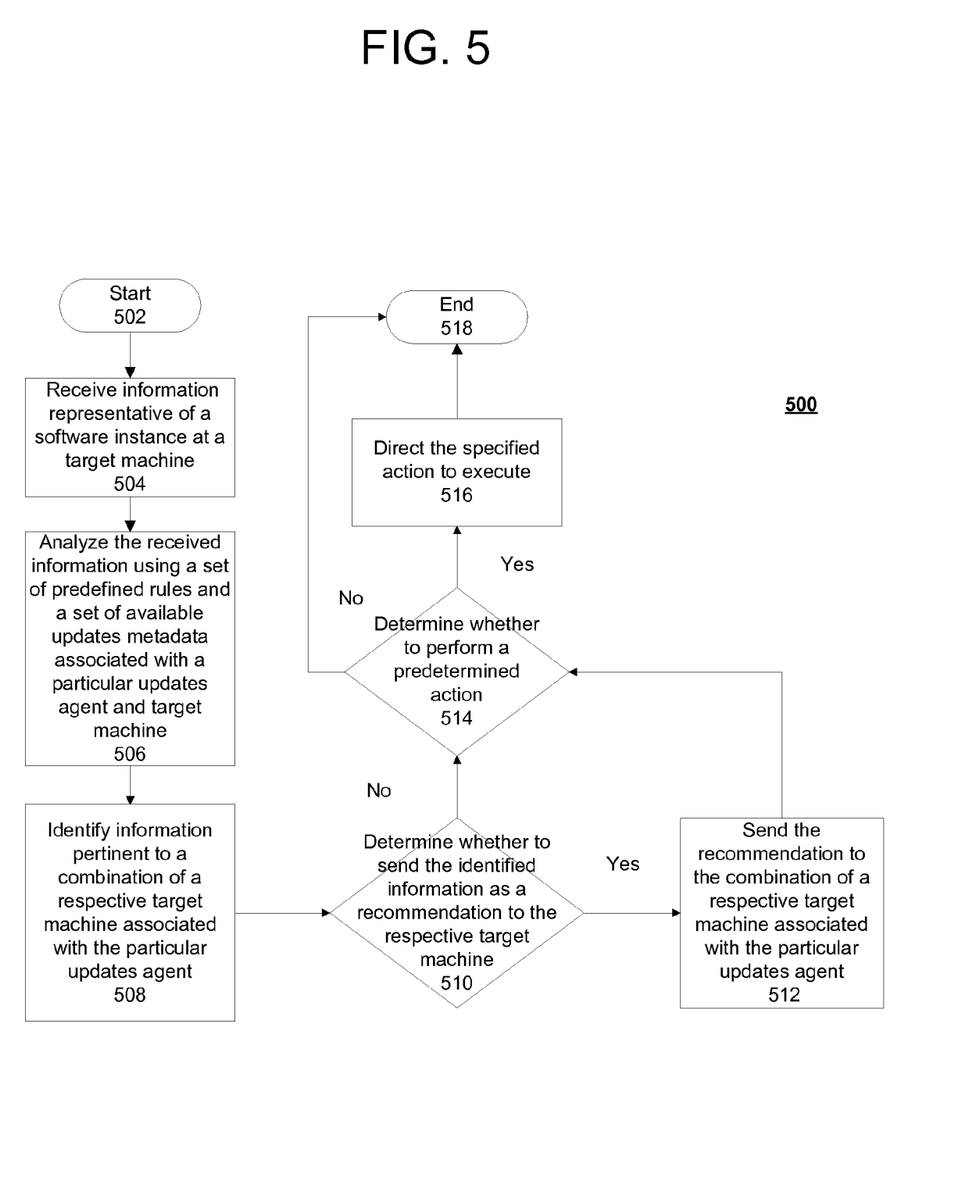
FIG. 5 is a flowchart of a process using a recommendation system of FIG. 3 operable for various embodiments of the disclosure.

With reference to FIG. 5 a flowchart of a process using a recommendation system operable for various embodiments of the disclosure is presented. Process 500 is an example of using recommendation system 300 of FIG. 3.

Process 500 begins (step 502) and obtains information representative of a software instance at a target machine (step 504). The software instance is representative of currently existing code including the form of one or more fixes, components, programs, or a set of which provides a function or service on the target system. The information may be received as a result of polling or requesting information as well as pushing information to a collection site using the updates agent previously disclosed. In an alternative, the information may be received at a respective updates agent on a particular target machine.

Process 500 analyzes the received information using a set of predefined rules and a set of available updates metadata associated with a particular updates agent and target machine (step 506). The rules comprise a set of rules, as in rules repository 406 available for selective processing by updates information server 402 in combination with available updates metadata 404 (all of recommendation system 400 of FIG. 4). Rules processing enables process 500 to perform complex conditional processing using customizable expressions to meet particular requirements of individual target machine and associated software environments.

The analysis processing may occur on the updates information server 302 or in a respective updates agent 308, both of recommendation system 300 of FIG. 3. For example, information is gathered from one or more updates agents and processed centrally for each individual target machine at the updates information server. In another example, each updates agent processed information associated with a respective target machine, using the centrally maintained rules repository 306 and updates metadata 304, both of recommendation system 300 of FIG. 3. Distributed processing of the analysis enables the recommendation system to scale support whereas the centrally maintained rules repository and updates metadata maintains control and consistency.

Process 500 identifies information pertinent to a combination of a respective target machine associated with the particular updates agent (step 508). The information identified is a result of analysis of the received information. For example, when the information received is processed using one or more defined rules with available updates metadata process 500 enables determination of whether suitable updates exist for a specific target machine. Further a recommendation may be made which is particular to the target machine through an updates agent on the specific target machine.

For example, the information identified indicates a particular software component, which is in need of an update to ensure consistent performance across a set of target machines. In this example a recommendation is sent to the updates agent of the target machine to prevent operation of the particular software component until synchronization with other similar components through installation of the needed update.

In another example, information pertinent to the target machine enables only a subset of updates to be recommended for installation specific to the target machine, thereby avoiding potentially wasted resources and the possibility of harmful updates through needless change.

Process 500 determines whether to send the identified information as a recommendation to the respective target machine (step 510). Having identified pertinent information, process 500 using specifications in the definitions of the applicable rules to send a recommendation, to perform an action stated in the applicable rules or a combination.

Responsive to a determination to send the recommendation, process 500 sends the recommendation to the combination of a respective target machine associated with the particular updates agent (step 512). When a recommendation is sent, a receiving updates agent reviews the recommendation as a candidate for a future action. For example, a recommendation may include an identifier of a forthcoming binary applicable to the target machine. In another example, a recommendation includes a set of fixes appropriate for the software environment of the target machine to be installed at a convenient time, such as a next scheduled maintenance cycle.

Responsive to a determination to not send the recommendation, and after having sent a recommendation, process 500 determines whether to perform a predetermined action (step 514). For example, analysis provides information for a hot fix needed on a target machine. A recommendation in this example is not needed because of the severity of the problem and importance of an immediate correction.

Process 500 directs the specified action to execute (step 516). Using the example, an updates agent of the target machine is directed to obtain the hot fix from the update binary repository, such as the update binary repository 408, for installation in a timely manner.

Thus is presented in an illustrative embodiment of a process for software version recommendation, a computer receives information representative of a software instance at a target machine, analyzes the received information using a set of predefined rules and a set of available updates metadata associated with a particular updates agent and target machine to identify information pertinent to a combination of a respective target machine associated with the particular updates agent. The computer, responsive to a determination to send the identified information as a recommendation to the respective target machine, sends the recommendation to the combination of the respective target machine associated with the particular updates agent.

In an alternate embodiment, a computer-implemented process for software version recommendation manages deployment of updates to software components. The computer-implemented process comprises maintaining an updates metadata repository in communication with a plurality of target systems, wherein the updates metadata repository contains available updates metadata for each of a plurality of software components and a rules repository containing a plurality of customizable rules defining a level of importance associated with each available update and plurality of registered events associated with operational aspects of the software components.

The computer-implemented process further receives a report of a status of respective versions of software components on each target system from a registered updates agent on each target system and responsive to a determination a level of a software component on a target system matches an existing rule, requests the updates agent on a respective target system to perform specific operations, selected from a group of operations comprising default operations or custom operations, depending on a matching rule, wherein the specific operations further comprise caching of rule outcome locally on the respective target system and invalidating a cache on the respective target system.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage medium having computer executable instructions stored thereon in a variety of forms. Examples of computer readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A process for software version recommendation, the process comprising:
   a computer receiving information from an updates agent operating at a target machine that specifies a current state of installation of a software instance operating at the target machine and other software components installed and active at the target machine;
   the computer analyzing the received information using, in combination, at least one predefined machine-specific rule specified with conditions by which to request the updates agent operating at the target machine to enforce a state upon the software instance at the target machine responsive to the updates agent capturing a startup attempt, and a set of available updates metadata specified for a combination of the target machine and the updates agent operating at the target machine;
   the computer identifying information pertinent to the combination of the target machine and the updates agent in accordance with the analyzed received information;
   the computer, responsive to a determination to send the identified information as a recommendation to the combination of the target machine and the updates agent, sending the recommendation to the combination of the target machine and the updates agent, and where the information identifies a fix to the software instance to ensure consistent performance across a set of target machines, the recommendation further comprises requesting the updates agent to prevent operation of the software instance until the fix is installed; and
   the computer, responsive to a determination to not send the identified information as the recommendation to the respective target machine, requesting the updates agent on the respective target machine to perform specific operations, comprising requesting the updates agent on the respective target machine to cache a rule outcome locally on the respective target machine and invalidate a cache on the target machine on one of a specified event and a predetermined scheduled basis.

2. The process of claim 1, where the updates agent comprises one of a plurality of registered updates agents each operating at one of a plurality of target machines, and where the computer receiving the information from the updates agent operating at the target machine that specifies the current state of installation of the software instance operating at the target machine and the other software components installed and active at the target machine further comprises:
   the computer receiving a report from each respective registered updates agent of a status of respective versions of software components on a respective one of the plurality of target machines at which the respective registered updates agent operates.

3. The process of claim 1, where the computer receiving the information from the updates agent operating at the target machine that specifies the current state of installation of the software instance operating at the target machine and the other software components installed and active at the target machine comprises:
   the computer receiving the information at a central location.

4. The process of claim 1, where the computer analyzing the received information comprises:
   the computer analyzing the received information at one of a central location and at the updates agent operating at the target machine using in combination the at least one predefined machine-specific rule specified with the conditions by which to request the updates agent operating at the target machine to enforce the state upon the software instance at the target machine responsive to the updates agent capturing the startup attempt, and the set of available updates metadata specified for the combination of the target machine and the updates agent operating at the target machine.

5. The process of claim 1, where the computer analyzing the received information comprises:
   the computer maintaining:
      an updates metadata repository in communication with a plurality of target machines, where the updates metadata repository contains the set of available updates metadata specified for each of a plurality of software components; and
      a rules repository containing a plurality of customizable machine-specific rules that define a level of importance associated with each available update and a plurality of registered events associated with operational aspects of the plurality of software components.

6. The process of claim 1, where the computer, further responsive to the determination to not send the identified information as the recommendation to the respective target machine, determining whether to perform a predetermined action by:
   determining whether a level of a software component on the target machine matches an existing rule; and responsive to a determination the level of the software component on the target machine matches the existing rule, requesting the updates agent on the target machine to perform additional specific operations, selected from a group of operations comprising default operations or custom operations, depending on a matching rule.

7. The process of claim 3, where the central location comprises an updates information server maintaining an updates metadata repository in communication with a plurality of target machines, and the updates metadata repository contains available updates metadata specified for each of a plurality of software components and a rules repository containing a plurality of customizable machine-specific rules that define a level of importance associated with each available update and a plurality of registered events associated with operational aspects of the plurality of software components.

* * * * *